United States Patent
Enami et al.

(10) Patent No.: US 6,265,480 B1
(45) Date of Patent: Jul. 24, 2001

(54) SILICONE GEL COMPOSITION

(75) Inventors: Hiroji Enami; Akihiro Nakamura, both of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/548,861

(22) Filed: Apr. 13, 2000

(30) Foreign Application Priority Data

Apr. 14, 1999 (JP) .................................................. 11-106185

(51) Int. Cl.$^7$ ...................................................... C08L 83/04
(52) U.S. Cl. ........................... 524/588; 524/261; 524/265; 524/366; 524/386; 524/492; 524/847; 524/862; 523/212; 523/213
(58) Field of Search ..................................... 524/261, 265, 524/386, 492, 588, 366, 847, 862; 523/212, 213

(56) References Cited

U.S. PATENT DOCUMENTS

| | | |
|---|---|---|
| 4,374,967 | 2/1983 | Brown et al. |
| 5,260,372 * | 11/1993 | Torporcer et al. .................... 524/785 |
| 5,532,294 | 7/1996 | Ikeno et al. .......................... 523/212 |
| 5,708,054 | 1/1998 | Mine et al. .......................... 523/212 |
| 5,969,023 * | 10/1999 | Enami et al. ......................... 524/252 |
| 6,001,918 * | 12/1999 | Enami et al. ......................... 524/493 |
| 6,121,368 * | 9/2000 | Heying et al. ....................... 524/493 |

FOREIGN PATENT DOCUMENTS

| | | | |
|---|---|---|---|
| 0 890 617 A2 | 1/1999 | (EP) | ............... C08L/83/07 |
| 62-181357 | 8/1987 | (JP) | ............... C08L/83/07 |
| 7324165 | 12/1995 | (JP) | ............... C08K/9/06 |
| 9132718 | 5/1997 | (JP) | ............... C08K/9/06 |

* cited by examiner

Primary Examiner—Robert Dawson
Assistant Examiner—Jeffrey B. Robertson
(74) Attorney, Agent, or Firm—Larry A. Milco

(57) ABSTRACT

A silicone gel composition comprising (A) 100 parts by weight of an organopolysiloxane comprising 80 to 98 mole % of $R(CH_3)SiO_{2/2}$ units, 0.1 to 10.0 mole % of $RSiO_{3/2}$ units, and 0.1 to 10 mole % of $R(CH_3)_2SiO_{1/2}$ units, wherein R is methyl, phenyl, or alkenyl, and provided 0.25 to 4.0 mole % the R groups in the organopolysiloxane are alkenyl; (B) an organopolysiloxane having an average of at least 2 silicon-bonded hydrogen atoms per molecule in an amount sufficient to provide from 0.1 to 5 silicon-bonded hydrogen atoms per alkenyl group in component (A); (C) a platinum catalyst; (D) 0.01 to 10 parts by weight of a silica powder; and (E) 0.01 to 5 parts by weight of a thixotropic agent selected from at least one epoxy compound, at least one polyhydric alcohol, and mixtures thereof; wherein the silicone gel composition has an apparent viscosity ratio of 2.0 to 10.0 and cures to form a silicone gel having a ¼ consistency of 10 to 200.

9 Claims, No Drawings

SILICONE GEL COMPOSITION

FIELD OF THE INVENTION

The present invention relates to a silicone gel composition and more particularly to a silicone gel composition having reduced spreadabity after application that cures to form a silicone gel having excellent cold-resistant properties.

BACKGROUND OF THE INVENTION

Curing of silicone gel compositions produces silicone gels with excellent electric, heat-resistant, weather-proof, and stress-relaxation properties. Therefore, such compositions find application as sealants, cushioning agents, shock-absorbing agents, or fillers for electric and electronic components. An example of such silicone gel compositions is a composition comprising a branch-chained organopolysiloxane having a molecular terminal capped with a silicon-bonded vinyl group, a diorganopolysiloxane having both molecular terminals capped with silicon-bonded vinyl groups, an organopolysiloxane having silicon-bonded hydrogen atoms, and a platinum catalyst (see Japanese Laid-Open Patent Application [Kokai] Sho 62-181,357).

However, the aforementioned silicone gel composition does not possess thixotropic properties and has a tendency to spreading out during application. Therefore, when this composition is used for sealing some electric and electronic components, it may [accidentally] seal other electric and electronic components for which sealing is undesirable.

On the other hand, silicone gel compositions with thixotropic properties are known. Examples of such compositions are a silicone gel composition comprising an organopolysiloxane having a silicon-bonded vinyl group on a molecular terminal and a 3,3,3-trifluoropropyl group in a side molecular chain, an organopolysiloxane having a silicon-bonded hydrogen atom on a molecular terminal and/or in a side molecular chain and a 3,3,3,3-trifluoropropyl group in a side molecular chain, a platinum-type catalyst, and a hydrophobized silica (see Japanese Laid-Open Patent Application [Kokai] HEI-7-324,165) and a two-liquid type silicone gel composition comprising the following components in a mixed state: an organopolysiloxane having at least two silicon-bonded alkenyl groups in one molecule, an organopolysiloxane having at least two silicon-bonded hydrogen atoms in one molecule, an inorganic filler, an organopolysiloxane having a silicon-bonded alkoxy group, and a platinum-type catalyst (see Japanese Laid-Open Patent Application [Kokai] HEI-9-132,718).

However, after application onto the surfaces of electric or electronic devices, these silicone gel compositions with thixotropic properties spread out over the surface when cured by heat and seal the areas of the electric or electronic device which are not supposed to be sealed. Furthermore, the silicone gels obtained as a result of curing the aforementioned compositions have poor resistance to cold temperatures. For example, they rapidly loose their gel-like state at such low temperatures as −40° C. and thus lead to breakage in conductive patterns or to cracking in soldered areas.

SUMMARY OF THE INVENTION

The present invention is directed to a silicone gel composition comprising:

(A) 100 parts by weight of an organopolysiloxane comprising 80 to 98 mole % of $R(CH_3)SiO_{2/2}$ units, 0.1 to 10.0 mole % of $RSiO_{3/2}$ units, and 0.1 to 10 mole % of $R(CH_3)_2SiO_{1/2}$ units, wherein R is methyl, phenyl, or alkenyl, provided that 0.25 to 4.0 mole % of the R groups in the organopolysiloxane are alkenyl;

(B) an organopolysiloxane having an average of at least 2 silicon-bonded hydrogen atoms per molecule in an amount sufficient to provide from 0.1 to 5 silicon-bonded hydrogen atoms per alkenyl group in component (A);

(C) a platinum catalyst;

(D) 0.01 to 10 parts by weight of a silica powder; and (E) 0.01 to 5 parts by weight of a thixotropic agent selected from at least one epoxy compound, at least one polyhydric alcohol, and mixtures thereof; wherein the silicone gel composition has an apparent viscosity ratio of 2.0 to 10.0 and cures to form a silicone gel having a ¼ consistency of 10 to 200.

DETAILED DESCRIPTION OF THE INVENTION

Component (A) of the present invention is an organopolysiloxane comprising $R(CH_3)SiO_{2/2}$ units, $RSiO_{3/2}$ units, and $R(CH_3)_2SiO_{1/2}$ units. Although the presence of only these three units in component (A) is sufficient, this component may contain other units in small quantities, such as $HO(CH_3)_2SiO_{1/2}$ units, $RO(CH_3)_2SiO_{1/2}$ units, $HO(CH_3)SiO_{2/2}$ units, and $RO(CH_3)SiO_{2/2}$ units. The organopolysiloxane can contain one or a combination of two or more of these other units. In the above formulae, R is methyl, phenyl, or alkenyl, provided that 0.25 to 4.0 mole % of all R groups in the organopolysiloxane are alkenyl. If the organopolysiloxane contains alkenyl groups in an amount below the lower limit of the aforementioned range, the composition will not cure to a sufficient degree. If, on the other hand, the organopolysiloxane contains alkenyl groups in an amount that exceeds the upper limit of the range, the cured product will loose its gel-like properties. Examples of alkenyl groups represented by R include, but are not limited to vinyl, allyl, isopropenyl, butenyl, pentenyl, and hexenyl. A vinyl group is most preferable. Furthermore, the polysiloxane should contain 80 to 98 mole % of $R(CH_3)SiO_{2/2}$ units, 0.1 to 10.0 mole % of $RSiO_{3/2}$ units, and 0.1 to 10 mole % of $R(CH_3)_2SiO_{1/2}$ units. If the organopolysiloxane contains $RSiO_{3/2}$ units in an amount below the lower limit of the aforementioned range, the resulting silicone gel tends to exhibit a decrease in cold-resistant properties. If, on the other hand, the organopolysiloxane contains $R(CH_3)SiO_{2/2}$ units in an amount that exceeds the upper limit of the range, the silicone gel composition will acquire a very high viscosity and will lose its flowability. Although there are no special limitations with regard to the viscosity of component (A), it is recommended that its viscosity be within the range of 10 to 100,000 mPa·s at 25° C.

Component (B) of the present invention is an organopolysiloxane having an average of at least two silicon-bonded hydrogen atoms per molecule. The molecular structure of component (B) may be a linear, branch-chained, a partially branch-chained linear, cyclic, net-like, or a resin-like molecular chain. Component (B) may comprise a single polymer with the aforementioned molecular structure, or a copolymer, or a mixture of the above. Furthermore, apart from the silicon-bonded hydrogen atoms, component (B) may contain other silicon-bonded groups, e.g., substituted or unsubstituted groups, such as methyl, ethyl, propyl, butyl, pentyl, hexyl, or a similar alkyl group; cyclopentyl, cyclohexyl, or a similar cycloalkyl group; phenyl, tolyl, xylyl, or a similar aryl group; benzyl, phenethyl, or a similar aralkyl group; 3,3,3-trifluoropropyl, 3-chloropropyl, or a similar halogenated alkyl group. Among the above, the methyl and phenyl groups are preferable. Although there are no special limitations with regard to the viscosity of component (B), the composition can be prepared with improved application properties if the viscosity is within the range of 1 to 100,000 mPa·s at 25° C.

The concentration of component (B) in the composition of the present invention is sufficient to provide from 0.1 to 5 silicon-bonded hydrogen atoms per alkenyl group in component (A). If the concentration of component (B) is below the lower limit of the recommended range, the composition tends to cure incompletely. If, on the other hand, the concentration of component (B) exceeds the upper limit of the range, the cured product of the composition either cannot be obtained in a gel form or tends to exhibit a decrease in heat-resistant properties.

Component (C) of the present invention is a platinum catalyst, which is used to accelerate curing. This component can be represented by a chloroplatinic acid, an alcoholic solution of a chloroplatinic acid, an olefin complex of platinum, a 1,3-divinyltetramethyl disiloxane complex of platinum, a carbonyl complex of platinum, a diketone complex of platinum, as well as resin powders containing a platinum catalyst in a thermoplastic resin, such as a silicone resin, acryl resin, carbonate resin, or the like.

It is recommended that the concentration of component (C) in the composition of the invention be in the range from 0.1 to 1,000 ppm of platinum metal, preferably 0.1 to 500 ppm of platinum metal, per 100 parts by weight of component (A). If the concentration of the platinum metal is below the lower limit of the above range, the rate of cure will be very slow. If, on the other hand, the concentration of the platinum metal exceeds the upper limit of the above range, the cure rate will not be further accelerated the cured silicone gel may be colored.

Component (D) of the present invention is a silica powder. In combination with component (E), the silica powder imparts thixotropic properties to the composition and reduces the spreadability of the composition during application. The silica powder can be represented by a fumed silica, fused silica, or a silica powder surface-treated with hexamethyl disilazane, dimethyldichlorosilane, methyl trichlorosilane, or a similar organic silicone compound. There are no special limitations with regard to the diameter of the silica particles. It is recommended, however, that the BET specific area of this component be at least 50 m$^2$/g, preferably at least 100 m$^2$/g.

It is recommended that the concentration of component (D) in the composition of the invention be within the range of 0.01 to 10 parts by weight, preferably 0.1 to 5 parts by weight, per 100 parts by weight of component (A). If the concentration of component (D) in the composition of the invention is lower than the minimal value of the above range, this will decrease the apparent viscosity ratio (the SVI value) at a 1:10 revolution number ratio, as specified by JIS K 7117, and therefore will not provide sufficient thixotropy, resulting in an increase in spreadability of the composition during application. If, on the other hand, the concentration of component (D) exceeds the upper limit of the above range, the composition will become too viscous and unsuitable for application under industrial conditions.

Component (E) of the present invention is a thixotropic agent selected from at least one epoxy compound, at least one polyhydric alcohol, and mixtures thereof. Component (E) in combination with component (D) imparts thixotropic properties of the composition of the invention, thus decreasing spreadability of the composition during application. Suitable epoxy compounds can be represented by, e.g., 3-glycidoxypropyl trimethoxysilane, 3-glycidoxypropyl methyldimethoxy silane, 3-glycidoxypropyl triethoxysilane, 2-(3,4-epoxycyclohexyl) ethyltrimethoxysilane, glycidylmethacrylate, and allylglycidyl ether. Polyhydric alcohols can be represented by, e.g., ethyleneglycol, 1,3-propanediol, 1,4-butanediol, trimethylolpropane, glycerol, and pentaerythritol.

The concentration of component (E) in the composition of the invention can be within the range of 0.01 to 5 parts by weight, preferably, 0.01 to 2 parts by weight, per 100 parts by weight of component (A). If the concentration of component (E) is below the lower limit of the above range, the apparent viscosity ratio (SVI) at a 1:10 revolution number ratio, as specified by JIS K 7117, will decrease and the composition will spread out during application. If, on the other hand, the concentration of the component (E) exceeds the upper limit of the above range, the mechanical properties of the silicone gel obtained as a result of curing will be impaired.

The composition of the invention is prepared by mixing the aforementioned components (A) through (E). If necessary, however, the composition may additionally include any other components, provided they are not an obstacle for achieving the object of the invention. Such additional components may be an acetylene-type compound, enyne compound, triazole compound, hydrazine compound, phosphine compound, mercaptane compound, or a similar addition-reaction inhibitor; a heat-resistant additive; a combustion retarder; a plasticizer; and an agent for imparting adhesive properties. The silicone gel obtained by curing the composition of the present invention is a colorless transparent or semitransparent substance. If necessary, however, the gel may be colored by introducing into the composition a pigment, conventional dye, or a fluorescent dye.

The composition of the invention is characterized by having, at a 1:10 revolution number ratio (an SVI value), an apparent viscosity ratio of 2.0 to 10.0, as specified by JIS K 7117. If the SVI value is below the lower limit of the aforementioned range, then during coating and sealing of electric or electronic devices the composition may seal other electric or electronic components for which sealing is undesirable. If, on the other hand, the SVI exceeds the upper limit of the above range, this will either decrease adhesion of the composition to the surfaces of electric or electronic devices, or will prevent the composition from penetrating intricate parts of the aforementioned devices.

Furthermore, the composition of the invention is characterized by forming, after being cured, a silicone gel with a cured-state ¼ consistency, as specified by JIS K 2220, within the range of 10 to 200, preferably 20 to 150. If the silicone gel has a ¼ consistency below the lower limit of the aforementioned range, the gel will have poor stress relaxation properties and will be prone to cracking. If, on the other hand, the ¼ consistency exceeds the upper limit of the range, the silicone gel will easily loose its flowability when it is subject to vibrations.

Since, after being cured, the composition of the invention has low spreadabity during application and cures to form a silicone gel having excellent cold-resistant properties, it is suitable for use as a sealant for electric and electronic devices, a shock-absorbing material, vibration-damping material, or a filler. Sealing of electric or electronic devices with the use of the composition of the present invention can be performed, e.g., by applying the composition onto appropriate surfaces of electric and electronic devices without subsequent treatment, or by heating the composition after application to a temperatures from 50 to 200° C.

EXAMPLES

The composition of the present invention will be now described in more detail with reference to practical examples. In these examples, all values of viscosity correspond to those at 25° C. The SVI values of the silicone gel composition, spreadability, and ¼ consistency of the silicone gel were measured by the methods described below.

SVI Value of the Silicone Gel Composition: Viscosity of the silicone gel composition of the present invention was measured according to JIS K 7117. More specifically, viscosity of the silicone gel composition was measured by means of a rotary viscometer at a revolution number ratio of 1:10, and then the SVI value was calculated by the following formula:

SVI Value=(viscosity at low number of revolutions)/(viscosity at high number of revolutions)

Spreadability of the Silicone Gel Composition: 1 ml of the silicone gel composition was taken as a sample, loaded into a 1 ml microcylinder, and then slowly unloaded onto the central area of a 100 mm×100 mm glass plate. After being kept intact for 10 minutes, the silicone gel composition spread out into a round spot. The diameter of this spot was measured in longitudinal and transverse directions. The sum of both measurements was used as a criterion for a value of spreadability 10 minutes after application.

Silicone Gel ¼ Consistency: 40 g of a silicone gel composition was loaded into a 50 ml glass flask and cured by heating the content of the flask for 60 min. at 120° C. After the obtained silicone gel was cooled to 25° C., the ¼ consistency of this silicone gel was measured in compliance with JIS K 2220.

Cold-resistant properties of the silicone gel were evaluated by measuring the ¼ consistency of the gel immediately after cooling to −55° C.

Examples 1 to 4 and Comparative Examples 1 to 4

Silicone gel compositions of eight types were prepared by combining and uniformly mixing components shown below in Table 1. Viscosity of these silicone gel compositions was measured by means of a rotary viscometer (model Vismeton VG-A1, Toshiba Systems Ltd.). In Practical Examples 1, 2, 4 and in Comparative Example 2, measurements were made with Rotor No. 4 at 60 rpm; in Practical Example 3, Comparative Examples 1, 3, and 4 measurements were made with Rotor No. 3 at 60 rpm. The results of measurements are shown in Table 1. Viscosity of the silicone gel compositions was also measured with the same rotors at 6 rpm, and appropriate SVI values were then calculated. The same silicone gel compositions were tested with regard to their spreadability. The results of these measurements are also given in Table 1.

In Table 1, $H/CH_2=CH$ represents the mole ratio of silicon-bonded hydrogen atoms contained in component (b-1) or (b-2) to vinyl groups in component (a-1) or (a-2).

Component (a-1): polyorganosiloxane having a viscosity of 800 mPa·s and containing the following units: 94.0 mole % of $(CH_3)_2SiO_{2/2}$ units, 3.3 mole % of $CH_3SiO_{3/2}$, 2.0 mole % of $(CH_3)_3SiO_{1/2}$, and 0.7 mole % of $(CH_3)_2(CH_2=CH)SiO_{1/2}$ units.

Component (a-2): a dimethylpolysiloxane having a viscosity of 2,000 mPa·s and having both molecular terminals capped with dimethylvinylsiloxane (content of vinyl group is 0.22 wt. %);

Component (b-1): a dimethylpolysiloxane having a viscosity of 10 mPa·s and having both molecular terminals capped with dimethylhydridosiloxy groups (content of silicon-bonded hydrogen atoms is 0.13 wt. %);

Component (b-2): a methylhydridopolysiloxane having a viscosity of 20 mPa·s and having both molecular terminals capped with trimethylsiloxy groups (content of silicon-bonded hydrogen atoms is 1.57 wt. %);

Component (c): a 1,3-divinyltetramethyldisiloxane solution of a 1,3-divinyltetramethydisiloxane complex of platinum with 0.5 wt. % concentration of metallic platinum;

Component (d-1): a fumed silica having a BET specific surface area of 200 $m^2/g$ and having a surface hydrophobized with hexamethyldisilazane;

Component (d-2): a surface-untreated fumed silica having a BET specific surface area of 200 $m^2/g$;

Component (e-1): 3-glycidoxypropyltriethoxysilane; and

Component (e-2): ethylene glycol.

TABLE 1

| | Present Invention | | | | Comparative Examples | | | |
|---|---|---|---|---|---|---|---|---|
| | Pr. Ex. 1 | Pr. Ex. 2 | Pr. Ex. 3 | Pr. Ex. 4 | Comp. Ex. 1 | Comp. Ex. 2 | Comp. Ex. 3 | Comp. Ex. 4 |
| Components (parts by weight) | | | | | | | | |
| Comp. a-1 | 90 | 90 | 90 | 90 | 90 | — | — | — |
| Comp. a-2 | — | — | — | — | — | 90 | 90 | 90 |
| Comp. b-1 | 5.6 | 5.6 | 6.2 | — | 5.6- | — | 1.1 | — |
| Comp. b-2 | — | — | — | 0.19 | — | 0.19 | 0.19 | 0.19 |
| Comp. c | 0.15 | 0.15 | 0.15 | 0.15 | 0.15 | 0.15 | 0.15 | 0.15 |
| Comp. d-1 | 6.5 | 6.5 | 3.3 | — | — | — | 3.3 | — |
| Comp. d-2 | — | — | — | 1.0 | — | 2.0 | — | — |
| Comp. e-1 | 0.9 | — | 1.0 | 1.0 | — | — | 1.0 | 1.0 |
| Comp. e-2 | — | 1.0 | — | — | — | — | — | — |
| $H/CH_2=CH$ | 1.0 | 1.0 | 1.1 | 0.4 | 1.0 | 0.4 | 0.6 | 0.35 |
| Viscosity (mPa · s) | 2600 | 2800 | 1200 | 3800 | 900 | 2200 | 1250 | 900 |
| SVI value | 3.8 | 4.0 | 2.1 | 5.0 | 1.0 | 44.5 | 4.0 | 1.0 |

TABLE 1-continued

| | Present Invention | | | | Comparative Examples | | | |
|---|---|---|---|---|---|---|---|---|
| | Pr. Ex. 1 | Pr. Ex. 2 | Pr. Ex. 3 | Pr. Ex. 4 | Comp. Ex. 1 | Comp. Ex. 2 | Comp. Ex. 3 | Comp. Ex. 4 |
| Spreadability (mm) | | | | | | | | |
| 10 min. after application | 69 | 65 | 80 | 50 | 120 | 63 | 68 | 155 |
| after 80° C. × 60 min. | 70 | 67 | 82 | 55 | 122 | 93 | 88 | 180 |
| ¼ consistency | | | | | | | | |
| 25° C. | 80 | 85 | 90 | 55 | 80 | 80 | 60 | 100 |
| −55° C. | 75 | 79 | 85 | 50 | 75 | 25 | 18 | 20 |

That which is claimed is:

1. A silicone gel composition comprising:
   (A) 100 parts by weight of an organopolysiloxane comprising 80 to 98 mole % of $R(CH_3)SiO_{2/2}$ units, 0.1 to 10.0 mole % of $RSiO_{3/2}$ units, and 0.1 to 10 mole % of $R(CH_3)_2SiO_{1/2}$ units, wherein R is methyl, phenyl, or alkenyl, provided that 0.25 to 4.0 mole % of the R groups in the organopolysiloxane are alkenyl;
   (B) an organopolysiloxane having an average of at least 2 silicon-bonded hydrogen atoms per molecule in an amount sufficient to provide from 0.1 to 5 silicon-bonded hydrogen atoms per alkenyl group in component (A);
   (C) a platinum catalyst;
   (D) 0.01 to 10 parts by weight of a silica powder; and
   (E) 0.01 to 5 parts by weight of a thixotropic agent selected from at least one epoxy compound, at least one polyhydric alcohol, and mixtures thereof; wherein the silicone gel composition has an apparent viscosity ratio of 2.0 to 10.0 and cures to form a silicone gel having a ¼ consistency of 10 to 200.

2. The silicone gel composition according to claim 1, wherein the alkenyl groups in component (A) are vinyl.

3. The silicone gel composition according to claim 1, wherein component (B) further comprises silicon-bonded organic groups selected from methyl and phenyl.

4. The silicone gel composition according to claim 1, wherein component (D) has a specific area of at least 50 $mm^2/g$.

5. The silicone gel composition according to claim 4, wherein component (D) has a specific area of at least 100 $mm^2/g$.

6. The silicone gel composition according to claim 1, wherein component (E) is at least one compound.

7. The silicone gel composition according to claim 6, wherein the epoxy compound is 3-glycidoxypropltriethoxysilane.

8. The silicone gel composition according to claim 1, wherein component (E) is a polyhydric alochol.

9. The silicone gel composition according to claim 8, wherein the polyhydric alcohol is ethylene glycol.

* * * * *